No. 627,895. Patented June 27, 1899.
G. BISCHOF.
APPARATUS FOR TREATING WHITE LEAD.
(Application filed July 15, 1898.)
(No Model.)
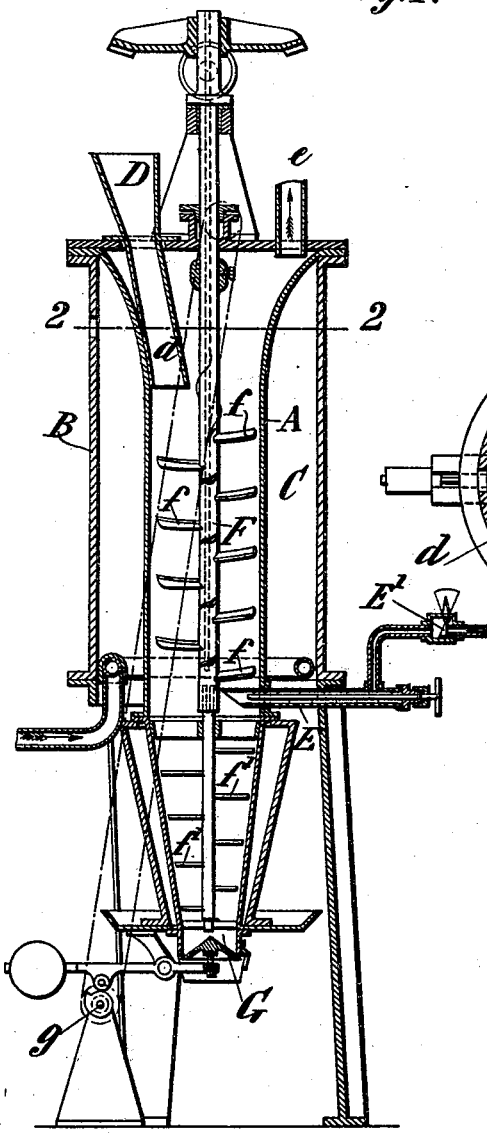
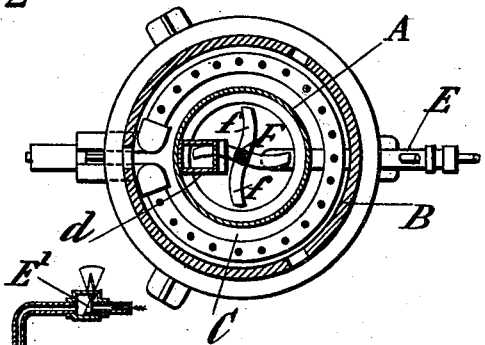

UNITED STATES PATENT OFFICE.

GUSTAV BISCHOF, OF LONDON, ENGLAND.

APPARATUS FOR TREATING WHITE LEAD.

SPECIFICATION forming part of Letters Patent No. 627,895, dated June 27, 1899.

Application filed July 15, 1898. Serial No. 686,072. (No model.)

*To all whom it may concern:*

Be it known that I, GUSTAV BISCHOF, a citizen of England, residing at 11 Victoria street, Westminster, London, England, have invented certain new and useful Improvements in Apparatus for Treating White Lead, (for which I have applied for patents in Great Britain, No. 30,444, dated December 23, 1897, No. 3,582, dated February 12, 1898, and No. 13,202, dated June 13, 1898,) of which the following is a specification.

For the manufacture of white lead of good quality from ordinary litharge I first treat that material with water-gas for the purpose of bringing it all to the condition of suboxid. I subject the product to the action of air and water in a mixer, thus converting it into a hydrated oxid. I subject this hydrated oxid to the action of sugar and acetic and carbonic acids, thus converting it into carbonate. The white lead thus obtained is churned with oil to convert it into the pasty condition in which it is usually supplied commercially. This paste is then subjected to the action of rollers in order to squeeze and wash out the acetic liquors, which I collect for subsequent use, and finally I remove all remaining water by treatment in a moderately-heated mixer.

My invention relates to apparatus whereby I effect the first of the processes mentioned above—that is to say, the reduction of litharge to lead suboxid—as I shall describe.

Referring to the accompanying drawings, Figure 1 is a vertical section, and Fig. 2 a sectional plan, of the apparatus for reducing litharge to suboxid.

A is a vertical cylindrical vessel inclosed in an outer vessel B, of larger diameter, forming between them an annular space C, in which gas is burned, so as to maintain the temperature of the vessel A at 250° to 300° centigrade. The cover of A is provided with a feed-hopper D, from which a chute $d$ leads some distance down. Near the bottom of A is an inlet E for pure water-gas, supplied by a compressor, and at the top is an outlet $e$, leading to a suitable gas-holder. The bottom A tapers, so as to form a discharge-passage $a$, leading to an outlet of smaller diameter, and the passage $a$ is surrounded by a jacket, through which cooling-water circulates.

A' is a gas-supply pipe for supplying gas to the burner $A^2$, surrounding the mixer A. Down the center of A extends a revolving spindle F, carrying blades $f$, which are so inclined that as they revolve they tend to raise the material in A, and in the passage $a$ the spindle has blades $f'$, which serve to agitate. At the bottom of the tapering passage $a$ is an outlet-opening closed by a loaded valve G.

The apparatus is worked as follows: The vessel being heated and the spindle caused to revolve, the litharge, which may consist more or less of oxids other than Pb.O, is fed by the hopper D and chute $d$. The material is raised by the revolving blades $f$ above the mouth of the chute $d$, so as to seal it against the escape of gas. Water-gas free from sulfur compounds is forced into the vessel at E under sufficient pressure to cause it to pass upward through the material, and the gas after giving up part of its hydrogen and oxygen from the oxids along with the steam resulting from the combination of the oxygen and hydrogen passes to a gas-holder, from which the gas freed from steam by condensation can be used again for reduction of the litharge or for other purposes. The material reduced to condition of suboxid, probably $Pb_2O$, is cooled as it descends the tapering passage $a$, portions of it being let out by opening the valve G, preferably by means of a revolving cam $g$.

The spindle F is preferably tubular, so that a suitable thermometer can be inserted to show the temperature within the vessel A.

Having thus described the nature of this invention and the best means I know for carrying the same into practical effect, I claim—

1. In an apparatus for reducing litharge to lead suboxid, the combination of a vertical vessel, a jacket around the same, an inlet for gas into said vessel, a tapered extension to the vessel, a separate water-jacket around the same, a revoluble spindle within said vessel and extension, inclined lifting-blades carried by the spindle within the vessel, and agitating-blades on the spindle within the extension, as and for the purpose specified.

2. In an apparatus for the purpose described, the combination of a vertical vessel, a jacket surrounding the same, a tapered extension to the vessel, a water-jacket around the same, an inlet for gas into said vessel, a revoluble spindle within the vessel and extension, inclined lifting-blades on the spindle within the vessel, agitating-blades carried by the spindle in the extension, and a counterbalanced valve at the lower end of the extension, as set forth.

3. In an apparatus for reducing litharge to lead suboxid, a vertical cylinder inclosed in a jacket adapted to be heated, a tapering extension inclosed in a water-jacket, a central revolving spindle provided upon its upper part with inclined lifting-blades and on its lower part with agitating-blades, a supply-hopper at the top, a pipe for supply of water-gas to the lower part of the cylinder, means for supplying water to the jacket around the extension, and a counterbalanced valve at the bottom of the extension, as set forth.

In testimony whereof I have hereunto set my hand in presence of two subscribing witnesses.

GUSTAV BISCHOF.

Witnesses:
JNO. P. M. MILLARD,
WALTER J. SKERTEN.